United States Patent [19]
Schmidt et al.

[11] Patent Number: 5,962,691
[45] Date of Patent: Oct. 5, 1999

[54] METHINE AND AZAMETHINE DYES BASED ON TRIFLUOROMETHYLPYRIDONES

[75] Inventors: Andreas Johann Schmidt, Freinsheim; Rüdiger Sens, Mannheim; Karl-Heinz Etzbach, Frankenthal, all of Germany

[73] Assignee: BASF Aktiengesellschaft, Ludwigshafen, Germany

[21] Appl. No.: 08/817,929

[22] PCT Filed: Oct. 31, 1995

[86] PCT No.: PCT/EP95/04267

§ 371 Date: May 9, 1997

§ 102(e) Date: May 9, 1997

[87] PCT Pub. No.: WO96/15195

PCT Pub. Date: May 23, 1996

[30] Foreign Application Priority Data

Nov. 10, 1994 [DE] Germany .................. 44 40 066

[51] Int. Cl.⁶ .............. C07D 401/04; C07D 417/04; B41M 5/24; B41M 5/26
[52] U.S. Cl. ............. 546/269.7; 546/256; 546/276.1; 546/277.1; 503/223; 8/603; 428/913; 428/914
[58] Field of Search .............. 546/269.7, 256, 546/276.1, 277.1; 428/913, 914; 503/223; 8/603

[56] References Cited

U.S. PATENT DOCUMENTS

| | | | |
|---|---|---|---|
| 5,079,365 | 1/1992 | Sens et al. | 546/119 |
| 5,132,438 | 7/1992 | Bach, et al | 552/295 |
| 5,147,845 | 9/1992 | Sens et al. | 503/227 |
| 5,376,150 | 12/1994 | Lange et al. | 8/638 |

FOREIGN PATENT DOCUMENTS

| | | |
|---|---|---|
| 0 399 473 | 5/1990 | European Pat. Off. . |
| 0 416 434 | 3/1991 | European Pat. Off. . |
| 0 591 736 | 4/1994 | European Pat. Off. . |
| A 64 068 743 | 3/1989 | Japan . |
| A 3 099 888 | 4/1991 | Japan . |
| WO 92 19684 | 11/1992 | WIPO . |

OTHER PUBLICATIONS

Matsui et al., Bulletin of the Chemical Society of Japan, vol. 66, (6) pp. 1790–1794, Jun. 1993.
Bulletin of the chemical society of Japan, Vol. 66, 1993.

*Primary Examiner*—Alan L. Rotman
*Attorney, Agent, or Firm*—Oblon, Spivak, McClelland, Maier & Neustadt, P.C.

[57] ABSTRACT

Pyridone dyes of the formula I

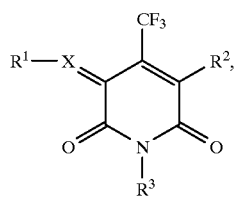

where
  X is nitrogen or CH,
  $R^1$ is a 5-membered or 6-membered carbocyclic or heterocyclic radical,
  $R^2$ is cyano, carbamoyl, $C_1$–$C_6$-alkoxycarbonyl or $C_1$–$C_4$-alkanoyl and
  $R^3$ is unsubstituted or substituted $C_1$–$C_{13}$-alkyl, unsubstituted or substituted phenyl or unsubstituted or substituted amino,
a method for their thermal transfer and a method for coloring or printing synthetic materials by means of the novel dyes.

The invention concerns pyridone dyes of the formula (I) in which X is nitrogen or CH, $R^1$ is a five-membered or six-membered carbocyclic or heterocyclic group, $R^2$ is cyano, carbamoyl, $C_1$–$C_6$ alkoxycarboyl or $C_1$–$C_4$ alkanoyl and $R^3$ is optionally substituted $C_1$–$C_{13}$ alkyl, optionally substituted phenyl or optionally substituted amino. The invention also concerns a method for the thermal transfer of such dyes as well as a method for dyeing or printing on synthetic materials using the dyes.

7 Claims, No Drawings

METHINE AND AZAMETHINE DYES BASED ON TRIFLUOROMETHYLPYRIDONES

This application is a 371 of PCT/EP95/04267 filed Oct. 31, 1995.

The present invention relates to novel pyridone dyes of the formula I

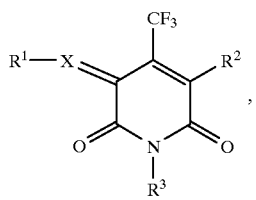
(I)

where
- X is nitrogen or CH,
- $R^1$ is a 5-membered or 6-membered carbocyclic or heterocyclic radical,
- $R^2$ is cyano, carbamoyl, $C_1$–$C_6$-alkoxycarbonyl or $C_1$–$C_4$-alkanoyl and
- $R^3$ is $C_1$–$C_{13}$-alkyl which is unsubstituted or substituted and may be interrupted by from 1 to 3 ether oxygen atoms, or is unsubstituted or substituted phenyl or a radical of the formula $NE^1E^2$, where $E^1$ and $E^2$ are identical or different and, independently of one another, are each hydrogen, $C_1$–$C_{13}$-alkyl which is unsubstituted or substituted and may be interrupted by from 1 to 3 ether oxygen atoms, or are each $C_5$–$C_7$-cycloalkyl, unsubstituted or substituted phenyl, unsubstituted or substituted pyridyl, unsubstituted or substituted $C_1$–$C_{13}$-alkanoyl, $C_1$–$C_{13}$-alkoxycarbonyl, unsubstituted or substituted $C_1$–$C_{13}$-alkylsulfonyl, $C_5$–$C_7$-cycloalkylsulfonyl, unsubstituted or substituted phenylsulfonyl, unsubstituted or substituted pyridylsulfonyl, unsubstituted or substituted benzoyl, pyridylcarbonyl or thienylcarbonyl or $E^1$ and $E^2$, together with the nitrogen atom linking them, are unsubstituted or $C_1$–$C_4$-alkyl-substituted succinimido, unsubstituted or $C_1$–$C_4$-alkyl-substituted phthalimido or a 5-membered or 6-membered saturated heterocyclic radical which may contain further heteroatoms, a process for their thermal transfer and a process for coloring or printing synthetic materials by means of the novel dyes.

JP-A-339 237/1993 describes the preparation of 1-alkyl-3-cyano-4-trifluoromethyl-6-hydroxypyrid-2-ones. Furthermore, JP-A-331 382/1993 and Bull. Chem. Soc. Japan 66 (1993), 1790–1794, disclose azodyes which have the abovementioned compound as a coupling component.

It is an object of the present invention to provide novel methine and azamethine dyes which have advantageous performance characteristics.

We have found that this object is achieved by the pyridone dyes of formula I which are defined at the outset.

$R^1$ is a 5-membered or 6-membered carbocyclic or heterocyclic, preferably aromatic, radical which is unsubstituted or substituted and may be benzofused.

$R^1$ may be derived, for example, from components from the benzene, indole, quinoline, naphthalene, pyrrole, thiazole, benzimidazole, benzothiazole, thiophene or pyridine series.

Important radicals $R^1$ are, for example, those of the formulae IIa to IIj

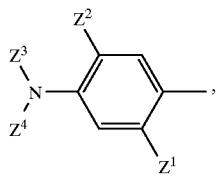
(IIa)

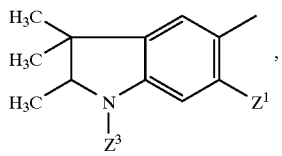
(IIb)

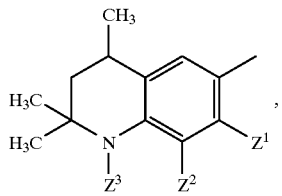
(IIc)

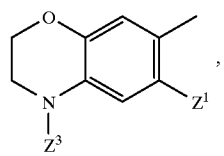
(IId)

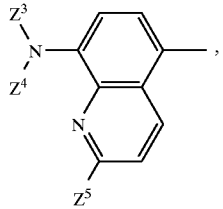
(IIe)

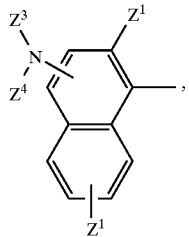
(IIf)

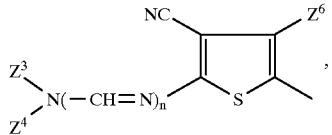
(IIg)

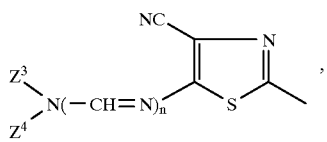
(IIh)

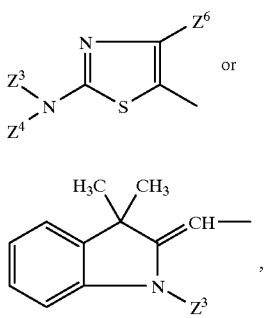

where
n is 0 or 1, $Z^1$ is hydrogen, $C_1$–$C_{13}$-alkyl which may be interrupted by from 1 to 3 ether oxygen atoms, or is hydroxyl, $C_1$–$C_4$-alkoxy, $C_1$–$C_4$-alkylsulfonylamino, $C_1$–$C_4$-mono- or dialkylaminosulfonyl-amino or a radical —NHCO$Z^7$ or —NHCO$_2Z^7$, where $Z^7$ is phenyl, benzyl, tolyl or $C_1$–$C_{13}$-alkyl which may be interrupted by from 1 to 3 ether oxygen atoms, $Z^2$ is hydrogen, $C_1$–$C_4$-alkyl or $C_1$–$C_4$-alkoxy, $Z^3$ and $Z^4$ are identical or different and, independently of one another, are each hydrogen or $C_1$–$C_{13}$-alkyl which is unsubstituted or substituted and may be interrupted by from 1 to 3 ether oxygen atoms, or are each $C_3$–$C_4$-alkenyl, $C_5$–$C_7$-cycloalkyl, phenyl or tolyl or, together with the nitrogen atom linking them, are a 5-membered or 6-membered saturated heterocyclic radical which may contain further heteroatoms, $Z^5$ is hydrogen or $C_1$–$C_4$-alkyl and $Z^6$ is hydrogen, halogen, $C_1$–$C_{13}$-alkyl, unsubstituted or substituted phenyl, unsubstituted or substituted benzyl, $C_5$–$C_7$-cycloalkyl, thienyl, hydroxyl, $C_1$–$C_4$-alkoxy, $C_1$–$C_4$-alkylthio or $C_1$–$C_{13}$-monoalkylamino.

All alkyl or alkenyl groups occurring in the abovementioned formulae may be either straight-chain or branched.

Where substituted alkyl radicals occur in the abovementioned formulae, unless stated otherwise, suitable substituents may be, for example, cyclohexyl, unsubstituted or substituted phenyl, $C_1$–$C_8$-alkanoyloxy, $C_1$–$C_8$-alkylaminocarbonyloxy, $C_1$–$C_8$-alkoxy-carbonyl, $C_1$–$C_8$-alkoxycarbonyloxy, where the alkyl chain of the three last mentioned radicals may be interrupted by from 1 to 3 ether oxygen atoms, and may be substituted by phenyl or phenoxy, and cyclohexyloxy, phenoxy, halogen, hydroxyl or cyano. The alkyl radicals have as a rule 1 or 2 substituents.

Where alkyl radicals which are interrupted by ether oxygen atoms occur in the abovementioned formulae, preferred alkyl radicals are those which are interrupted by 1 or 2 ether oxygen atoms.

Where substituted phenyl or pyridyl radicals occur in the above-mentioned formulae, suitable substituents may be, for example, $C_1$–$C_8$-alkyl, $C_1$–$C_8$-alkoxy, halogen, in particular chlorine or bromine, nitro or carboxyl. The phenyl or pyridyl radicals have as a rule from 1 to 3 substituents.

Suitable radicals $R^3$, $E^1$, $E^2$, $Z^1$, $Z^2$, $Z^3$, $Z^4$, $Z^5$, $Z^6$ and $Z^7$ are, for example, methyl, ethyl, propyl, isopropyl, butyl, isobutyl, sec-butyl or tert-butyl.

$R^3$, $E^1$, $E^2$, $Z^1$, $Z^3$, $Z^4$, $Z^6$ and $Z^7$ are each furthermore, for example, pentyl, isopentyl, neopentyl, tert-pentyl, hexyl, 2-methylpentyl, heptyl, octyl, 2-ethylhexyl, isooctyl, nonyl, isononyl, decyl, idodecyl, undecyl, dodecyl, tridecyl or isotridecyl. [The names isooctyl, isononyl, isodecyl and isotridecyl are trivial names and originate from the alcohols obtained by the oxo synthesis (cf. Ullmann's Encyclopedia of Industrial Chemistry, 5th Edition, Vol. A1, pages 290 to 293, and Vol. A10, pages 284 and 285).]

$R^3$, $E^1$, $E^2$, $Z^1$, $Z^3$, $Z^4$ and $Z^7$ are each furthermore, for example, 2-methoxyethyl, 2-ethoxyethyl, 2-propoxyethyl, 2-butoxyethyl, 2- or 3-methoxypropyl, 2- or 3-ethoxypropyl, 2- or 3-propoxypropyl, 2- or 3-butoxypropyl, 2- or 4-methoxybutyl, 2- or 4-ethoxybutyl, 2- or 4-butoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 4,8-dioxadecyl, 3,6,9-trioxadecyl or 3,6,9-trioxaundecyl.

$Z^1$, $Z^2$ and $Z^6$ are each furthermore, for example, methoxy, ethoxy, propoxy, isopropoxy, butoxy, isobutoxy or sec-butoxy.

$R^3$, $E^1$, $E^2$ and $Z^6$ are each furthermore, for example, phenyl, 2-, 3- or 4-methylphenyl, 2-, 3- or 4-ethylphenyl, 2-, 3- or 4-propylphenyl, 2-, 3- or 4-isopropylphenyl, 2-, 3- or 4-butylphenyl, 2,4-dimethylphenyl, 2-, 3- or 4-methoxyphenyl, 2-, 3- or 4-ethoxyphenyl, 2-, 3- or 4-isobutoxyphenyl, 2,4-dimethoxyphenyl, 2-, 3- or 4-chlorophenyl, 2,6-dichlorophenyl, 2-, 3- or 4-nitrophenyl or 2-, 3- or 4-carboxyphenyl.

$Z^3$, $Z^4$, $Z^6$, $E^1$ and $E^2$ are each furthermore, for example, cyclopentyl, cyclohexyl or cycloheptyl.

$R^3$, $Z^3$, $Z^4$, $E^1$ and $E^2$ are each furthermore, for example, benzyl, 2-methylbenzyl, 1- or 2-phenylethyl, 2-hydroxyethyl, 2- or 3-hydroxypropyl, 2-cyanoethyl, 2- or 3-cyanopropyl, 2-acetyloxyethyl, 2- or 3-acetyloxypropyl, 2-isobutyryloxyethyl, 2- or 3-isobutyryloxypropyl, 2-methoxycarbonylethyl, 2- or 3-methoxycarbonylpropyl, 2-ethoxycarbonylethyl, 2- or 3-ethoxycarbonylpropyl, 2-methoxycarbonyloxyethyl, 2- or 3-methoxycarbonyloxypropyl, 2-ethoxycarbonyloxyethyl, 2- or 3-ethoxycarbonyloxypropyl, 2-butoxycarbonyloxyethyl, 2- or 3-butoxycarbonyloxypropyl, 2-(2-phenylethoxycarbonyloxy)ethyl, 2- or 3-(2-phenylethoxycarbonyloxy)propyl, 2-(2-ethoxyethoxycarbonyloxy)ethyl or 2- or 3-(2-ethoxyethoxycarbonyloxy)propyl.

$E^1$ and $E^2$ are each furthermore, for example, pyridyl, 2-, 3- or 4-methylpyridyl, 2-, 3- or 4-methoxypyridyl, formyl, acetyl, propionyl, butyryl, isobutyryl, pentanoyl, hexanoyl, heptanoyl, octanoyl, 2-ethylhexanoyl, methoxycarbonyl, ethoxycarbonyl, propoxycarbonyl, isopropoxycarbonyl, butoxycarbonyl, isobutoxycarbonyl, sec-butoxycarbonyl, methylsulfonyl, ethylsulfonyl, propylsulfonyl, isopropylsulfonyl, butylsulfonyl, cyclopentylsulfonyl, cyclohexylsulfonyl, cycloheptylsulfonyl, phenylsulfonyl, tolylsulfonyl, pyridylsulfonyl, benzoyl, 2-, 3- or 4-methylbenzoyl, 2-, 3- or 4-methoxybenzoyl, thien-2-ylcarbonyl or thien-3-ylcarbonyl.

$Z^1$ is furthermore, for example, methylsulfonylamino, ethylsulfonylamino, propylsulfonylamino, isopropylsulfonylamino, butylsulfonylamino, mono- or dimethylaminosulfonylamino, mono- or diethylaminosulfonylamino, mono- or dipropylaminosulfonylamino, mono- or diisopropylaminosulfonylamino, mono- or dibutylaminosulfonylamino or (N-methyl-N-ethylaminosulfonyl) amino.

$Z^6$ is furthermore, for example, fluorine, chlorine, bromine, benzyl, 2-methylbenzyl, 2,4-dimethylbenzyl, 2-methoxybenzyl, 2,4-dimethoxybenzyl, methylamino, ethylamino, propylamino, isopropylamino, butylamino, pentylamino, hexylamino, heptylamino, octylamino, 2-ethylhexylamino, methylthio, ethylthio, propylthio, isopropylthio or butylthio.

$Z^3$ and $Z^4$ are each furthermore, for example, allyl or methallyl.

$R^2$ is, for example, methoxycarbonyl, ethoxycarbonyl, propoxycarbonyl, isopropoxycarbonyl, butoxycarbonyl, pentyloxycarbonyl, hexyloxycarbonyl, formyl, acetyl, propionyl, butyryl or isobutyryl.

Where $E^1$ and $E^2$ or $Z^3$ and $Z^4$, in each case together with the nitrogen atom linking them, are a 5-membered or 6-membered saturated heterocyclic radical which may contain further heteroatoms, suitable radicals of this type may be, for example, pyrrolidinyl, piperidinyl, morpholinyl, piperazinyl or N-($C_1$–$C_4$-alkyl)piperazinyl.

Pyridone dyes of formula I where X is CH are preferred.

Pyridone dyes of formula I where $R^2$ is cyano are also preferred.

Pyridone dyes of the formula I where $R^3$ is $C_1$–$C_{13}$-alkyl which may be interrupted by from 1 to 3 ether oxygen atoms are furthermore preferred.

Pyridone dyes of the formula I where $R^3$ is $C_1$–$C_6$-alkyl which may be interrupted by 1 or 2 ether oxygen atoms are particularly preferred.

Pyridone dyes of the formula I where $R^1$ is a radical which is derived from a component from the benzene or thiazole series, in particular a radical of the formula IIi, are also preferred.

Particularly noteworthy pyridone dyes are those of the formula Ia

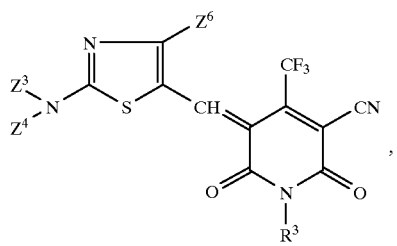

(Ia)

where $R^3$ is $C_1$–$C_8$-alkyl, $Z^3$ and $Z^4$, independently of one another, are each $C_1$–$C_8$-alkyl which is unsubstituted or substituted by $C_1$–$C_4$-alkoxy, $C_1$–$C_4$-alkoxycarbonyl or phenyl, or are each cyclopentyl, cyclohexyl or prop-1-en-3-yl and $Z^6$ is branched $C_3$–$C_{10}$-alkyl or phenyl, in particular branched $C_3$–$C_8$-alkyl.

Very particularly noteworthy pyridone dyes are those of the formula Ia where $Z^6$ is branched $C_3$–$C_6$-alkyl, in particular branched $C_5$-alkyl, in particular neopentyl.

Other very particularly noteworthy pyridone dyes are those of the formula Ia where, when $Z^3$ and $Z^4$ are each $C_1$–$C_8$-alkyl, the total number of carbon atoms present in the two radicals $Z^3$ and $Z^4$ is at least 7, in particular at least 8.

The novel pyridone dyes of the formula I can be prepared by methods known per se.

For example, those pyridone dyes of the formula I where X is CH may be obtained by condensation of aldehydes of the formula III $R^1$—CHO　(III), where $R^1$ has the abovementioned meanings, with trifluoromethylpyridones of the formula IV

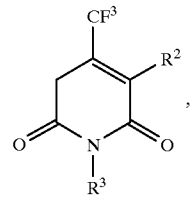

(IV)

where $R^2$ and $R^3$ each have the abovementioned meanings.

Those pyridone dyes of the formula I where X is nitrogen may be obtained, for example, by condensation of nitroso compounds of the formula V $R^1$—NO　(V), where $R^1$ has the abovementioned meanings, or by oxidative coupling of amino compounds of the formula IV $R^1$—$NH^2$　(VI), where $R^1$ has the abovementioned meanings, with the trifluoromethylpyridones IV.

The intermediates for the preparation of the novel pyridone dyes are as a rule compounds known per se.

The present invention furthermore relates to a process for transferring dyes from a substrate to a plastic-coated paper by diffusion or sublimation with the aid of an energy source, which comprises using a carrier on which one or more pyridone dyes of the formula I are present.

For the preparation of the dye substrates required for the novel process, the dyes in the formula I in a suitable organic solvent or in a mixture of solvents are processed with one or more binders, with or without the addition of assistants, to give a printing ink. The latter contains the dyes of the formula I preferably in molecular disperse form. The printing ink can be applied to the inert substrate by means of a knife coater, and the dyeing can be dried, for example, in the air or by using a hot air blower. Suitable organic solvents for the dyes of the formula I are, for example, those in which the solubility of the dyes of the formula I is greater than 1, preferably greater than 5%, by weight at 20° C.

Examples are ethanol, propanol, isobutanol, tetrahydrofuran, methylene chloride, methyl ethyl ketone, cyclopentanone, cyclohexanone, toluene, chlorobenzene and mixtures thereof.

Suitable binders are all resins or polymer materials which are soluble in organic solvents and are capable of binding the dyes to the inert substrate in an abrasion-resistant manner. Preferred binders are those which, after drying of the printing ink in the air, take up the dyes in the form of a clear, transparent film without visible crystallization of the dyes occurring.

Such binders are mentioned, for example, in U.S. Pat. No. 5,132,438 or in the corresponding patent applications cited there. Other examples are saturated linear polyesters.

Preferred binders are ethylcellulose, ethylhydroxyethylcellulose, polyvinylbutyral, polyvinyl acetate, cellulose propionate and saturated linear polyesters.

The weight ratio of binder to dye is in general from 1:1 to 10:1.

Suitable assistants are, for example, release agents as mentioned in U.S. Pat. No. 5,132,438 or the corresponding patent applications cited there. Other examples are in particular organic additives which prevent the transfer dyes from crystallizing out during storage or during heating of the color tape, for example cholesterol or vanillin.

Suitable inert substrates are described, for example, in U.S. Pat. No. 5,132,438 or in the corresponding patent applications cited there. The thickness of the dye substrate is in general from 3 to 30 μm.

Suitable dye acceptor layers are in principle all heat-stable plastic layers having an affinity to the dyes to be transferred, for example modified polycarbonates or polyesters. Further details in this context can be obtained, for example, from U.S. Pat. No. 5,132,438 or the corresponding patent applications cited there.

Transfer is effected by means of an energy source, for example a laser or a thermal printing head, and the latter must be capable of being heated to ≧300° C. so that the dye transfer can take place in the time range t: 0<t<15 msec. During this procedure, the dye migrates out of the transfer sheet and diffuses into the surface coating of the accepting medium.

The novel dyes of the formula I have advantageous performance characteristics in dye transfer. They have high solubility in the color tape (good compatibility with the binder), high stability in the printing ink, good transferability, high image stability (ie. good lightfastness and good stability to environmental influences, eg. humidity, temperature or chemicals) and permit flexible coloristic adaptation to existing subtractive primary colors in the sense of optimum trichromatic dyeing (maximum possible brilliance of primary or mixed colors and deep neutral black).

It has furthermore been found that synthetic materials can be advantageously colored or printed if they are treated with one or more of the novel dyes. Synthetic materials are, for example, polyesters, polyamides or polycarbonates. Particular examples are materials in textile form, such as fibers, yarns, twists, knitwear, woven fabrics or nonwovens of polyester, modified polyester, for example anionically modified polyester, union fabrics of polyester with cellulose, cotton, viscose or wool, or polyamide. The coloring and printing conditions are known per se. Dyeings or prints having good lightfastness, high brilliance and very good wetfastnesses, for example very good fastness to washing or to perspiration, are obtained.

The novel dyes can also be used for coloring keratin fibers, for example in hair coloring or in the coloring of skins.

The novel dyes of the formula I can also advantageously be used for the production of color filters, as described, for example, in EP-A-399 473.

Finally, they may furthermore advantageously be used as colorants for the preparation of toners for electrophotography.

The examples which follow illustrate the invention.

A) Preparation

EXAMPLE 1 a) 128 g of potassium thiocyanate in 150 ml of acetone were initially taken, and 185 ml of 3,3-dimethylbutyryl chloride were added at from 20 to 25° C. Stirring was carried out for 8 hours at room temperature, after which 234 ml of dibutylamine were added dropwise. After 4 hours, 120 g of ice and 142 ml of 50% strength by weight sodium hydroxide solution were added, the temperature being kept at max. 40° C. A solution of 132 g of chloroacetic acid in 120 ml of water was added and the mixture was heated at 80° C. for 8 hours. Phase separation was then carried out at 60° C. The organic phase was diluted with methylene chloride and extracted several times by shaking with dilute hydrochloric acid and then with water. The organic phase was dried over sodium sulfate, after which the solvent was distilled off in a rotary evaporator. 311 g of a dark oil which contained 69.5% (GC) of the compound of the formula

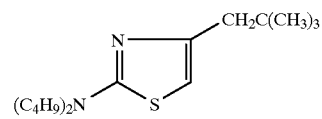

were obtained.

b) A solution of 105 g of 2-dibutylamino-4-(2,2-dimethylpropyl)-thiazole (stage a)) in 95 ml of N,N-dimethylformamide was added dropwise, while cooling with ice, to a solution of 441 ml of N,N-dimethylformamide and 110 g of phosphorus oxytrichloride, which solution was prepared at 0–5° C. The mixture was stirred for two hours, after which it was poured onto ice/water, stirred overnight and then extracted with ethyl acetate. The organic phase was dried over sodium sulfate and the solvent was then distilled off in a rotary evaporator. 113.6 g of a brown oil which contained 83.5% (GC) of the compound of the formula

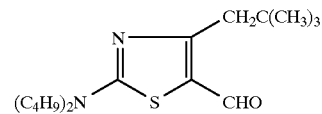

were obtained.

c) 6.54 g of 3-cyano-6-hydroxy-1-methyl-4-trifluoromethyl-1-H-pyridin-2-one and 11.16 g of 2-dibutylamino-4-(2,2-dimethyl-propyl)-5-formylthiazole (stage b)) were suspended in 25 ml of acetic anhydride at room temperature and then heated at 80° C. for 1 hour. The precipitate which separated out on cooling was filtered off with suction, washed with water and methanol and recrystallized from ethyl acetate. 8.4 g (54.8% of theory) of a red crystalline compound of the formula

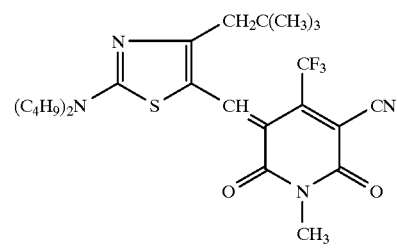

were obtained.

Mp.: 169° C.; $\lambda_{max}$ (in $CH_2Cl_2$): 545 nm; $^1$H-NMR ($CDCl_3$, 250 MHz): δ=8.02 (s; 1H), 3.80 (t, J=8 Hz; 2H), 3.58 (t, J=8 Hz; 2H), 3.38 (s; 3H), 2.80 (s; 2H), 1.70 (m; 4H), 1.38 (m; 4H), 1.00 (s; 9H), 0.95 (m; 6H).

|  | C | H | N | O | F | S |
| --- | --- | --- | --- | --- | --- | --- |
| calculated | 58.75 | 6.52 | 10.98 | 6.27 | 11.17 | 6.27 |
| found | 58.80 | 6.40 | 10.90 | 6.30 | 11.20 | 6.30 |

EXAMPLE 2

6.34 g of 3-cyano-6-hydroxy-1-methyl-4-trifluoromethyl-1-H-pyrid-2-one and 4.37 g of 2-dibutylamino-4-phenyl-5-nitrosothiazole were suspended in 35 ml of acetic anhydride at room temperature and then heated at 80° C. for 1 hour. The precipitate which separated out on cooling was filtered off with suction, washed with water and hexane and recrystallized from ethyl acetate. 7.4 g (71.7% of theory) of a blue crystalline compound of the formula

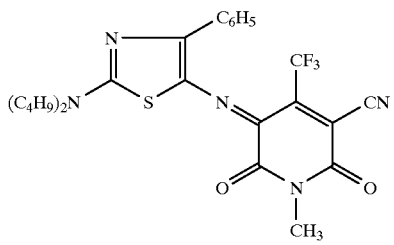

were obtained.

Mp.: 231–33° C.; $\lambda_{max}$ (in $CH_2Cl_2$): 598 nm; $^1$H-NMR ($CDCl_3$, 200 MHz): δ=8.00 (d, J=7 Hz; 2H), 7.62 (dd, J=7 Hz, J=7 Hz; 1 H), 7.52 (d, J=7 Hz; 2H), 4.02 (t, J=7 Hz; 2H), 3.65 (t, J=8 Hz; 2H), 3.38 (8; 3 H), 1.80 (m; 4 H), 1.42 (m; 4H), 1.00 (m; 6H).

The dyes shown in the Table below are obtained in a similar manner.

TABLE 1

| Example No. | $NZ^3Z^4$ | $Z^6$ | $R^3$ | X | $\lambda_{max}$ [nm] (in $CH_2Cl_2$) |
|---|---|---|---|---|---|
| 3 | cyclohexyl-N(C$_2$H$_5$)H | $C_6H_5$ | $C_4H_9$ | N | 603 |
| 4 | $(C_4H_9)_2N$ | $C_6H_5$ | $C_4H_9$ | N | 605 |
| 5 | cyclohexyl-N(C$_2$H$_5$)H | $C_6H_5$ | $CH_3$ | N | 598 |
| 6 | $(C_4H_9)_2N$ | $CH_2C(CH_3)_3$ | $C_2H_5$ | CH | 544 |
| 7 | $[(CH_3)_2CHCH_2]_2N$ | $C(CH_3)_3$ | $C_4H_9$ | N | 587 |
| 8 | $(C_2H_9)_2N$ | $CH_2C(CH_3)_3$ | $CH_3$ | CH | 550 |
| 9 | $(C_2H_5)_2N$ | $CH_2C(CH_3)_3$ | $CH_3$ | CH | 542 |
| 10 | $(C_4H_9)_2N$ | $C_6H_5$ | $C_4H_9$ | CH | 557 |
| 11 | $CH_3OC_2H_4OC_3H_6$-N(C$_2$H$_5$) | $C_6H_5$ | $CH_3$ | CH | 552 |
| 12 | 2-methylphenyl-N(C$_2$H$_5$) | $C(CH_3)_3$ | $CH_3$ | CH | 548 |
| 13 | $(C_4H_9)_2N$ | $C_6H_{11}$ | $CH_3$ | CH | 543 |
| 14 | $(C_4H_9)_2N$ | $C_6H_5$ | $CH_3$ | CH | 553 |
| 15 | $(C_4H_9)_2N$ | $C_6H_5$ | $C_6H_{13}$ | CH | 554 |
| 16 | $(C_4H_9)_2N$ | $C_6H_5$ | $C_2H_5$ | CH | 554 |
| 17 | $(C_4H_9)_2N$ | 2,3-dimethylphenyl | $CH_3$ | CH | 546 |

TABLE 1-continued

[Chemical structure: thiazole connected via X to a pyridinedione ring with CF₃ and CN substituents, with Z³Z⁴N- group and Z⁶ substituent, R³ on ring N]

| Example No. | $NZ^3Z^4$ | $Z^6$ | $R^3$ | X | $\lambda_{max}$ [nm] (in $CH_2Cl_2$) |
|---|---|---|---|---|---|
| 18 | $(C_4H_9)_2N$ | $C(CH_3)_3$ | $CH_3$ | CH | 550 |
| 19 | $(C_4H_9)_2N$ | $CH(C_2H_5)C_4H_9$ | $CH_3$ | CH | 541 |
| 20 | $(C_4H_9)_2N$ | $CH(CH_3)_2$ | $CH_3$ | CH | 541 |
| 21 | $CH_3OC_2H_4OC_3H_6\text{-N-}C_2H_5$ | $C(CH_3)_3$ | $CH_3$ | CH | 550 |
| 22 | $(C_4H_9)_2N$ | $C_6H_5$ | $COCH_3$ | CH | 553 |

TABLE 2

[Chemical structure: phenyl ring with $Z^1$, $Z^2$ substituents and $Z^3Z^4N$- amino group, connected to pyridinedione with CF₃ and CN, R³ on ring N]

| Example No. | $NZ^3Z^4$ | $Z^1$ | $Z^2$ | $R^3$ | $\lambda_{max}$ [nm] (in $CH_2Cl_2$) |
|---|---|---|---|---|---|
| 23 | $(C_2H_5)_2N$ | H | H | $C_6H_{13}$ | 635 |
| 24 | $(C_4H_9)_2N$ | $CH_3$ | H | $CH_3$ | 698 |
| 25 | $(C_2H_5)_2N$ | $NHCOCH_3$ | H | $C_2H_5$ | 637 |
| 26 | $(C_2H_5)_2N$ | H | H | $C_2H_5$ | 607 |
| 27 | $(C_2H_5)_2N$ | $NHCOCH_3$ | H | $CH_3$ | 631 |
| 29 | $(C_2H_5)_2N$ | H | H | $CH_3$ | 606 |

B) Dye Transfer

General Method:

a) 10 g of dye are stirred into 100 g of a 10% strength by weight solution of a binder in a methyl ethyl ketone/toluene/cyclohexanone mixture (4.5:2:2 v/v/v), if necessary with brief heating to 80–90° C.

The resulting printing ink is applied by means of a 6 μm doctor blade to a 6 μm thick polyester film, to the back of which a suitable sliding layer has been applied, and is blown dry for 1 minute with a hot air blower. Before the color tape can be printed, it must be further dried for at least 24 hours in the air since residual solvents may adversely affect the printing process.

b) The color tapes are printed on commercial video print paper (type VY-S from Hitachi) on a computer-controlled experimental arrangement which is equipped with a commercial thermal printing head.

The energy output of the thermal printing head is controlled by changing the voltage, the set pulse time being 7 ms and only one pulse being output. The output energy is from 0.7 to 2.0 mJ/Dot.

Since the extent of the dyeing is directly proportional to the energy supplied, it is possible to produce a color wedge and to evaluate it spectroscopically.

The Q* value (=energy in mJ for the extinction value 1) is determined from the plot of the color depth against the energy supplied per heating element.

(In the data for Q*, the first value in each case relates to a binder based on polyester and the second value in each case to a binder based on polyvinylbutyral.)

The results obtained are shown in Table 3 below.

TABLE 3

| Dye No. | Q* [mJ/Dot] |
|---|---|
| 1 | 0.76 |
|   | 0.76 |
| 2 | 1.01 |
|   | 1.12 |
| 3 | 1.02 |
|   | 1.16 |
| 4 | 1.01 |
|   | 1.10 |
| 5 | 1.58 |
|   | 1.34 |
| 6 | 0.80 |
|   | 0.82 |
| 7 | 1.01 |
|   | 1.12 |
| 8 | 0.80 |
|   | 0.81 |
| 9 | 0.83 |
|   | 0.91 |
| 10 | 0.84 |
|   | 0.88 |
| 11 | 0.84 |
|   | 0.89 |
| 12 | 0.77 |
|   | 0.87 |
| 13 | 0.86 |
|   | 0.88 |
| 14 | 0.81 |
|   | 0.87 |
| 15 | 0.85 |
|   | 0.87 |
| 16 | 0.83 |
|   | 0.86 |

TABLE 3-continued

| Dye No. | Q* [mJ/Dot] |
|---|---|
| 17 | 0.84 |
|    | 0.86 |
| 18 | 0.84 |
|    | 0.79 |
| 19 | 0.78 |
|    | 0.83 |
| 20 | 0.80 |
|    | 0.77 |
| 21 | 0.75 |
|    | 0.78 |
| 22 | 1.08 |
| 23 | 1.08 |
| 24 | 1.04 |
|    | 1.01 |
| 25 | 0.95 |
| 26 | 1.18 |
| 27 | 0.97 |
|    | 0.94 |

C) Dyeing Method

Polyester fabric is introduced at 55° C. into a dyeing bath which contains X% of dye (based on the weight of the fabric), 1 g/l of the sodium salt of a condensate of naphthalene-2-sulfonic acid and formaldehyde and 0.5 ml/l of buffer solution (pH 4.5). The bath is then heated to 130° C. in the course of 30 minutes and kept at this temperature for a further 60 minutes.

After being cooled and washed, the fabric is reductively cleaned for 30 minutes at 70° C. in a bath which contains 4 g/l of 32% strength by weight sodium hydroxide solution, 2 g/l of sodium dithionite and 1 g/l of an adduct of 12 mol of ethylene oxide with 1 mol of oleylamine and is then washed and dried.

Very lightfast brilliant red dyeings which have good fastness to washing and perspiration were obtained with the dyes of Examples 1, 6 and 14.

Example 1: X=0.5, 0.75, 1.0 and 1.5 [%]
Example 6: X=0.1, 0.5, 0.75 [%]
Example 14: X=0.35, 0.5, 0.8 and 10 [%]

We claim:

1. A pyridone dye of the formula

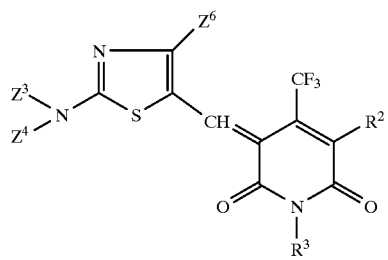

wherein $R^2$ is cyano, carbamoyl, $C_{1-6}$-alkoxycarbonyl or $C_{1-4}$-alkanoyl;

$R^3$ is $C_{1-13}$-alkyl; phenyl; substituted phenyl; or a radical of the formula: $NE^1E^2$, wherein $E^1$ and $E^2$ are identical or different, and, independently of one another, are each hydrogen, $C_{1-13}$-alkyl, substituted $C_{1-13}$-alkyl, or $E^1$ and $E^2$ are each $C_{5-7}$-cycloalkyl, phenyl, substituted phenyl, pyridyl, substituted pyridyl, $C_{1-13}$-alkanoyl, substituted $C_{1-13}$-alkanoyl, $C_{1-13}$-alkoxycarbonyl, $C_{1-13}$-alkylsulfonyl, substituted $C_{1-13}$-alkylsulfonyl, $C_{5-7}$-cycloalkylsulfonyl, phenylsulfonyl, substituted phenylsulfonyl, pyridylsulfonyl, substituted pyridylsulfonyl, benzoyl, substituted benzoyl, pyridylcarbonyl or thienylcarbonyl; or $E^1$ and $E^2$, together with the nitrogen atom linking them, are unsubstituted, $C_{1-4}$-alkyl-substituted succinimido or $C_{1-4}$-alkyl-substituted phthalimido;

$Z^3$ and $Z^4$, independently of one another, are each $C_{1-8}$-alkyl unsubstituted or substituted by $C_{1-4}$-alkoxy, $C_{1-4}$-alkoxycarbonyl or phenyl or are each cyclopentyl, cyclohexyl or prop-1-en-3-yl; and $Z^6$ is branched $C_{3-10}$-alkyl or phenyl.

2. A pyridone dye of formula (Ia)

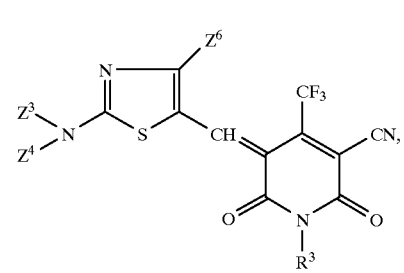

(Ia)

where $R^3$ is $C_{1-8}$-alkyl, $Z^3$ and Z, independently of one another, are each $C_{1-8}$-alkyl which is unsubstituted or substituted by $C_{1-4}$-alkoxy, $C_{1-4}$-alkoxycarbonyl or phenyl, or are each cyclopentyl, cyclohexyl or prop-1-en-3-yl and $Z^6$ is branched $C_{3-10}$-alkyl or phenyl.

3. A pyridone dye having the formula:

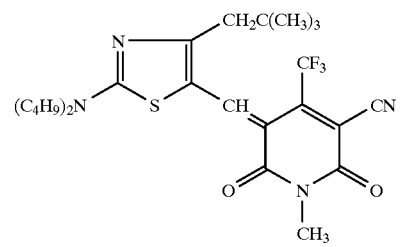

4. A process for transferring dyes from a substrate to a plastic-coated paper, which comprises:

subliming at least one pyridone dye as claimed in claim 1 from a substrate onto a plastic coated paper.

5. A process for transferring dyes from a substrate to a plastic-coated paper, which comprises:

diffusing at least one pyridone dye as claimed in claim 1 from a substrate onto a plastic coated paper.

6. A process for coloring or printing synthetic materials, comprising:

treating the synthetic material with at least one pyridone dye as claimed in claim 1.

7. The pyridone dye as claimed in claim 1, wherein $R^3$, $Z^3$, $Z^4$ and $Z^6$ are methyl, ethyl, propyl, isopropyl, butyl, isobutyl, sec-butyl or tert-butyl.

* * * * *